(12) United States Patent
McNutt

(10) Patent No.: US 10,784,584 B1
(45) Date of Patent: Sep. 22, 2020

(54) RADIATING COAXIAL CABLE CONFIGURED TO TRANSMIT POWER AND DATA

(71) Applicant: Superior Essex International LP, Atlanta, GA (US)

(72) Inventor: Christopher W. McNutt, Woodstock, GA (US)

(73) Assignee: Superior Essex International LP, Atlanta, GA (US)

( * ) Notice: Subject to any disclaimer, the term of this patent is extended or adjusted under 35 U.S.C. 154(b) by 23 days.

(21) Appl. No.: 16/249,947

(22) Filed: Jan. 17, 2019

(51) Int. Cl.
*H01Q 13/20* (2006.01)
*H04B 10/2575* (2013.01)
*G02B 6/44* (2006.01)
*H01Q 5/22* (2015.01)
*H04B 10/80* (2013.01)

(52) U.S. Cl.
CPC .......... *H01Q 13/203* (2013.01); *G02B 6/443* (2013.01); *H04B 10/25752* (2013.01); *H01Q 5/22* (2015.01); *H04B 10/807* (2013.01)

(58) Field of Classification Search
CPC .. H01Q 13/203; H01Q 5/22; H04B 10/25752; H04B 10/807; G02B 6/443
See application file for complete search history.

(56) References Cited

U.S. PATENT DOCUMENTS

| | | | | |
|---|---|---|---|---|
| 4,339,733 | A * | 7/1982 | Smith | H01Q 13/203 333/237 |
| 4,599,121 | A * | 7/1986 | Edwards | H01B 7/285 156/48 |
| 4,695,127 | A * | 9/1987 | Ohlhaber | G02B 6/443 174/70 R |
| 6,480,163 | B1 | 11/2002 | Knop et al. | |
| 8,809,683 | B2 | 8/2014 | Niwa et al. | |
| 2003/0122636 | A1* | 7/2003 | DiBenedetto | H01Q 13/203 333/237 |
| 2013/0336623 | A1* | 12/2013 | Chamberlain | G02B 6/4416 385/101 |

* cited by examiner

*Primary Examiner* — Daniel D Chang

(57) ABSTRACT

A coaxial cable may include a center conductor having a first resistance, and dielectric material may be formed around the center conductor. An outer conductor may be coaxially formed around the center conductor and the dielectric material. The outer conductor may have a second resistance substantially equal to the first resistance, and at least one slot may be formed through the outer conductor. A jacket may be formed around the outer conductor.

20 Claims, 4 Drawing Sheets

RADIATING COAXIAL CABLE CONFIGURED TO TRANSMIT POWER AND DATA

TECHNICAL FIELD

Embodiments of the disclosure relate generally to coaxial cables and, more particularly, to radiating coaxial cables configured to transmit both power and data signals.

BACKGROUND

Coaxial cables are utilized as transmission lines in a wide variety of applications. A coaxial cable typically includes an inner conductor formed by a tubular conducting shield with an insulating layer positioned between the two coaxial conductors. In certain applications, coaxial cables are formed with gaps or slots in their outer conductors in order to allow signals to be leaked into or out of the cables. These cables are commonly referred to as leaky or radiating coaxial cables, and they may function as transmitting and receiving antennae. Radiating coaxial cables are utilized for wireless communications in mining and underground railway systems.

However, due to signal leakage, conventional radiating coaxial cables typically have a limited range. As such, amplifiers are required to be inserted at regular intervals, typically every 350 to 500 meters, in order to boost the signals propagated through the cables. Although it is possible for conventional radiating coaxial cables to power amplifiers and other equipment, the powered equipment must typically be impedance matched to the coaxial cable. In other words, only specialized equipment can be powered by conventional coaxial cables. Accordingly, there is an opportunity for improved coaxial cables that can provide both power and data signals.

Additionally, customer demand drives a need for cables and networks that can deliver data at higher rates. For example, fifth generation ("5G") networks are currently being deployed that demand higher bandwidth and data transmission rates for wireless communications. Many 5G networks will include a wide variety of small cells, amplifiers, and repeaters that facilitate data transmission. There is an opportunity for improved radiating coaxial cables that can provide power and data in 5G and other networks. Further there is an opportunity for improved radiating coaxial cables that incorporate one or more optical fibers that facilitate additional data transmission.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
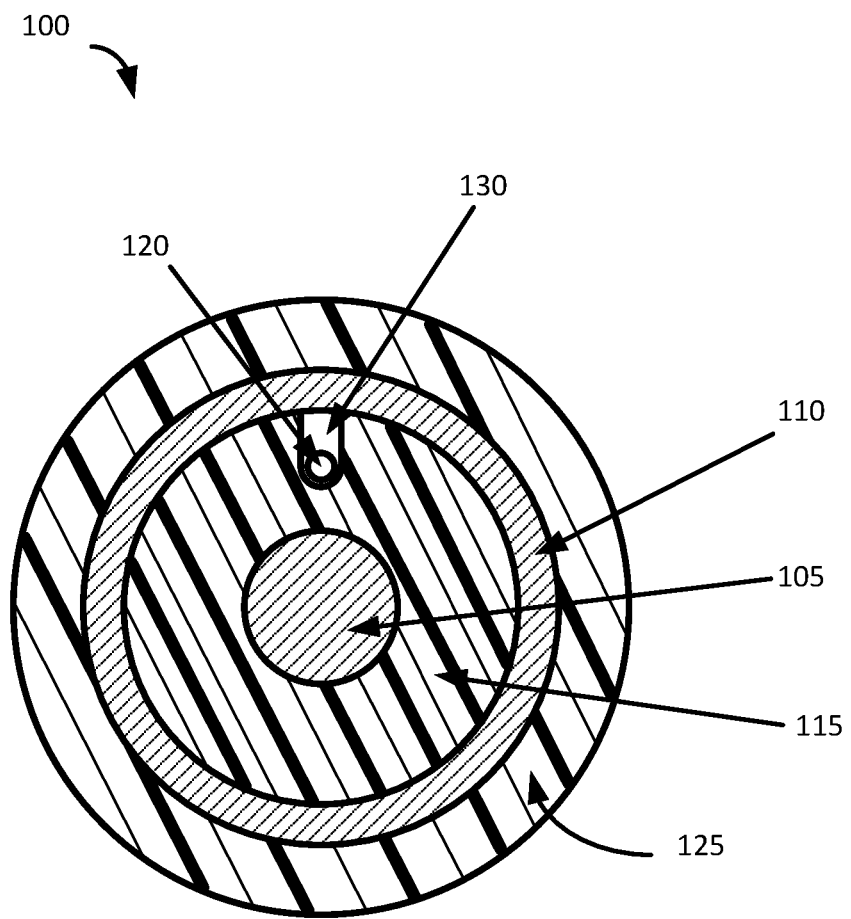
FIGS. 1-3B depict cross-sectional views of example radiating coaxial cables that may transmit both power and data signals, according to illustrative embodiments of the disclosure.

Various embodiments of the present disclosure are directed to radiating coaxial cables that are suitable for transmitting both data and power signals. A coaxial cable may include an inner conductor and an outer conductor coaxially arranged around the inner conductor. Dielectric material may be positioned between the inner and outer conductors. According to an aspect of the disclosure, the inner and outer conductors may be formed as a balanced pair of conductors. For example, the direct current resistances of the inner and outer conductors may be matched or substantially equal. As a result, the inner and outer conductors may be suitable for use in transmitting power signals. In certain embodiments, a first conductor (e.g., the inner conductor, etc.) may be utilized to transmit a downstream power signal, and a second conductor (e.g., the outer conductor, etc.) may be utilized to transmit a return signal.

According to an aspect of the disclosure, the coaxial cable may be formed as a radiating or leaky coaxial cable. In certain embodiments, one or more slots or openings may be formed through the outer conductor in order to permit leakage of signals through the outer conductor. For example, communications signals may be transmitted and received by the coaxial cable via the one or more slots. In this regard, the coaxial cable may function as an antennae that facilitates wireless communication. Any number of slots and/or configurations of slots may be formed through the outer conductor as desired in various embodiments. For example, one or more slots may extend along a longitudinal direction of the outer conductor. As another example, a plurality of slots may be spaced along a longitudinal length of the outer conductor. In certain embodiments, the one or more slots formed through the outer conductor may facilitate signal leakage at a desired frequency or within a desired frequency range.

In certain embodiments, one or more optical fibers may additionally be incorporated into a radiating coaxial cable. For example, one or more optical fibers may be positioned between the inner and outer conductors. In certain embodiments, one or more optical fibers may be embedded or otherwise positioned within the dielectric material. For example, one or more optical fibers may be positioned within one or more channels or slots formed within the dielectric material. As another example, one or more optical fibers may be positioned within spaces formed between sections of dielectric material. As yet another example, the dielectric material may include one or more tubes that are positioned between the inner and outer conductors, such as a tube that is helically wound around the inner conductor, and one or more optical fibers may be positioned within the one or more tubes. In yet other embodiments, one or more optical fibers may be positioned within an inner conductor or within channels, cavities, gaps, or spaces formed within the inner conductor. Regardless of the construction utilized to incorporate optical fibers into a radiating coaxial cable, the optical fibers may facilitate data transmission within the cable.

A radiating coaxial cable formed in accordance with embodiments of the present disclosure may be utilized in a wide variety of suitable applications. For example, the radiating coaxial cable may be incorporated into cellular or mobile communications networks. In operation, one or more radiating coaxial cables may extend between amplifiers, repeaters, fiber multiplexers, and/or other suitable devices and equipment within a cellular network. The balanced conductors may be utilized to transmit power signals that provide power to desired devices and equipment. Data signals may be transmitted by the inner conductor and/or the optical fiber(s). Additionally, the slots formed in the outer conductor of the radiating coaxial cables may facilitate wireless transmission with external devices, such as mobile devices. The inventive radiating coaxial cables may be utilized in other suitable applications and environments as desired, such as industrial applications, communication systems deployed along roadways and/or within tunnels, automotive and/or vehicle applications (e.g., to facilitate wireless communication within a vehicle, etc.), etc.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-sectional view of an example radiating coaxial cable 100, according to an illustrative embodiment of the disclosure. The coaxial cable 100 may include an inner conductor 105 and an outer conductor 110. Dielectric material 115 or a dielectric separator may be positioned between the inner and outer conductors 105, 110. The dielectric material 115 may provide desired separation between the inner and outer conductors 105, 110 and, in certain embodiments, may provide structural and/or anti-buckling support for the coaxial cable 100. In certain embodiments, one or more optical fibers 120 may be positioned between the inner and outer conductors 105, 110, for example, within one or more slots, channels, or spaces formed through the dielectric material 115 and/or positioned between sections of the dielectric material 115. Additionally, a jacket 125 or insulation layer may be formed around the outer conductor 110. Each of the components of the coaxial cable 100 are described in greater detail below.

The inner conductor 105 and the outer conductor 110 may be positioned or arranged in a coaxial configuration having a common axis that extends along a longitudinal direction of the cable 100. The inner conductor 105 or center conductor may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C. Additionally, the inner conductor 105 may have any suitable diameter, gauge, cross-sectional area, and/or other dimensions. In certain embodiments, the inner conductor 105 may be sized in order to facilitate transmission of a desired power signal via the cable 100. Further, the inner conductor 105 may be formed as either a solid conductor, as a conductor that includes a plurality of conductive strands that are twisted together, or as a cylindrical conductor (e.g., a hollow conductor, a conductive tube, etc.).

The outer conductor 110 may also be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C. The outer conductor 110 may also be formed with a wide variety of suitable dimensions, such as any suitable thickness, cross-sectional area, etc.

A wide variety of suitable techniques and/or processes may be utilized to form an outer conductor 110 as desired in various embodiments. In certain embodiments, the outer conductor 110 may be formed as a foil that is wrapped or otherwise positioned around the inner conductor 110 and the dielectric strength member 115. In other embodiments, a plurality of layers of electrically conductive material (e.g., stacked layers of metallic foil, etc.) may be utilized to form the outer conductor 110. In yet other embodiments, electrically conductive material may be pressed, bent, cut, or otherwise mechanically shaped in order to form an outer conductor 110 that can be coaxially arranged around the inner conductor 105.

In other embodiments, a plurality of electrically conductive strands (e.g., metallic strands, etc.) may be utilized to form the outer conductor 110. For example, one or more rings of electrically conductive strands or separate conductive components may be arranged or positioned around the inner conductor 105 and the dielectric material 115 in order to form the outer conductor 110. In yet other embodiments, electrically conductive strands (e.g., metallic strands, etc.) may be combined either together or optionally with strands of other material in order to form a longitudinally continuous braided layer that may be utilized as the outer conductor 110. In yet other embodiments, one or more electrically conductive layers (e.g., a metallic foil, metallic ink or paid, liquid metal, etc.) may be combined with one or more base or dielectric layers in order to form an outer conductor 110 that may be coaxially arranged around the inner conductor 105. Other suitable outer conductor constructions may be utilized as desired in other embodiments.

Additionally, the outer conductor 110 may be formed with a wide variety of suitable dimensions, such as any suitable thickness, and/or cross-sectional area. In certain embodiments, one or more dimensions of the outer conductor 110 may be selected such that the outer conductor 110 has a direct current resistance that is matched or substantially equal to that of the inner conductor 105. Additionally, one or more dimensions of the outer conductor 110 may be based at least in part upon the materials utilized to form the outer conductor 110 such that a desired DC resistance and/or power transmission capability may be attained.

In certain embodiments, an inner conductor 105 may be utilized to transmit or propagate a power signal over the cable 100, and the outer conductor 110 may be utilized as a return conductor or a return path for the power signal. In other embodiments, the outer conductor 105 may be utilized to transmit a power signal while the inner conductor 110 serves as a return path. Additionally, in certain embodiments, the inner and outer conductors 105, 110 may be formed as a balanced pair of conductors. For example, the direct current ("DC") resistances and/or the power capacities of the inner and outer conductors 105, 110 may be matched or substantially equal. As desired, the cross-sectional areas of the balanced inner and outer conductors 105, 110 may be sized to carry a desired amount of current over a desired length within a system incorporating the cable 100. Further, in certain embodiments, the conductors 105, 110 of the cable 100 may be utilized to facilitate simultaneous transmission of a radio frequency ("RF") communications signal.

According to an aspect of the disclosure, the coaxial cable 100 may also be formed as a radiating or leaky coaxial cable. In certain embodiments, one or more slots or openings may be formed through the outer conductor 110 in order to permit leakage of signals through the outer conductor 110. For example, communications signals may be transmitted ("leaked") and received ("absorbed") by the coaxial cable 100 via the one or more slots. In this regard, the coaxial cable 100 may function as an antennae that facilitates wireless communication.

Any number of slots may be formed through the outer conductor 110 as desired in various embodiments. For example, one, two, three, four, six, eight, ten, or any other number of slots may be formed. In certain embodiments, a certain number of slots may be performed within a given longitudinal length of the coaxial cable 100, such as one, two, three, four, six, eight, or ten slots per ever meter along a longitudinal length of the coaxial cable 100. Additionally, a wide variety of different configurations of slots may be formed in various embodiments. In certain embodiments, one or more slots may extend along a longitudinal direction of the outer conductor 110. For example, a plurality of longitudinally extending slots may be spaced around a circumference of an outer conductor 110.

In other embodiments, a plurality of slots may be spaced along a longitudinal length of the outer conductor 110. For example, a respective set of one or more slots may be positioned at respective spaced locations along a longitudinal length of the outer conductor 110. Gaps or spaces positioned between longitudinally adjacent sets of slots may have a wide variety of suitable longitudinal lengths. Examples of suitable gap lengths include, but are not limited to, approximately 0.01, 0.02, 0.04, 0.06, 0.08, 0.1, 0.15, 0.20, 0.25, 0.30, 0.40, 0.50, 0.60, 0.75, 0.80, 0.90, or 1.0 meters, gap lengths included in a range between any two of the above values, and/or gap lengths included in a range bounded on a minimum or maximum end by one of the above values. Additionally, in certain embodiments, the gap lengths between each adjacent set of slots may be approximately equal. In other embodiments, the gap lengths between at least two adjacent sets of slots may be different. In yet other embodiments, rather than having gaps between adjacent sets of slots, the longitudinal positions of two or more adjacent sets of slots may overlap or partially overlap one another. For example, a first set of one or more slots may begin at point "A" along a longitudinal length of an outer conductor 110 and extend to point "B" along the longitudinal length. An adjacent second set of one or more slots may begin at point "C" along the longitudinal length and extend to point "D" along the longitudinal length. In certain embodiments, point "C" may be positioned between points "A" and "B" such that partial overlap exists between the first and second sets of slots. As desired, gap lengths and/or other positioning of sets (e.g., overlapping sets, etc.) of one or more slots may be formed in accordance with a desired pattern. In other embodiments, gap lengths and/or other positioning of sets of one or more slots may be formed in accordance with a random or pseudo-random manner.

In the event that a plurality of sets of slots are formed at respective spaced longitudinal locations along an outer conductor 110, any number of suitable slots may be formed or included within each of the plurality of sets. Examples of suitable numbers of slots that may be included in a set of slots include, but are not limited to, 1, 2, 3, 4, 5, 6, 7, 8, 9, or 10 slots, a number of slots included in a range between any two of the above values, or a number of slots included in a range bounded on either a minimum or maximum end by one of the above values. In the event that a set of slots includes a plurality of slots, each slot may be positioned at any desired location along a circumference of the outer conductor 110. For example, a plurality of slots may be spaced along a circumference of the outer conductor. As desired, each slot included in a set of slots may be formed with a wide variety of suitable dimensions. For example, each slot may have any desirable longitudinal length, width, diameter, angle of extension relative to the longitudinal direction (e.g. slots may be formed in a diagonal direction relative to the longitudinal direction, etc.), cross-sectional area, etc. In certain embodiments, each slot included in a set may have approximately equal dimensions. In other embodiments, at least two slots included in a set may have one or more differing dimensions (e.g., angle of extension, longitudinal length, etc.). Further, in certain embodiments, different sets of slots may be formed with similar or approximately equal dimensions. In other embodiments, at least two sets of slots may be formed with one or more differing dimensions (e.g., longitudinal lengths, directions of extension, etc.). Indeed, a wide variety of suitable slot configurations and/or patterns may be formed as desired in various embodiments. A few non-limiting examples of slot configurations are described in greater detail below with reference to FIGS. 4A-4C.

Additionally, in certain embodiments, slots may be formed through the outer conductor 110 in order to facilitate signal leakage. In other embodiments, slots may be formed partially through the outer conductor 110 in a manner that facilitates signal leakage. In yet other embodiments, slots may be formed from different material than a remainder of the outer conductor 110 in order to facilitate signal leakage. As desired, a combination of slots formed through the outer conductor 110, slots formed partially through the outer conductor 110, and/or slots formed from different material(s) may be utilized to facilitate signal leakage.

In certain embodiments, slots may be formed and/or positioned in a configuration or arrangement that facilitates signal leakage from the coaxial cable 100 at a desired frequency or within a desired range of frequencies. In this regard, the coaxial cable 100 may be configured to facilitate wireless transmission at a desired frequency or within a desired range of frequencies. For example, the slots may be positioned or arranged to facilitate signal leakage and/or wireless communication within a frequency range suitable for third generation ("3G"), fourth generation ("4G"), fifth generation ("5G"), or any other suitable cellular or mobile communication system, protocol, and/or standard. In certain embodiments, the slots may be formed and/or positioned to facilitate communication at frequencies of approximately 600 MHz, 800 MHz, 1 GHz, 2 GHz, 4 GHz, 6 GHz, 8 GHz, 10 GHz, 12 GHz, 15 GHz, 18 GHz, 20 GHz, 22 GHz, 24 GHz, 26 GHz, 28 GHz, frequencies included in a range between any two of the above values, frequencies included in a range bounded on either a minimum or maximum end by one of the above values, and/or any other suitable frequencies.

With continued reference to the cable 100, dielectric material 115 or a dielectric separator may be positioned between the inner conductor 105 and the outer conductor 110. The dielectric material 115 may function as insulation between the two conductors 105, 110 and, in certain embodiments, may provide structural and/or anti-buckling support for the cable 100. The dielectric material 115 may be formed from a wide variety of suitable materials and/or combinations of materials. For example, the dielectric material may be formed from one or more polymeric materials (e.g., polypropylene, polyethylene, etc.), on or more fluoropolymers, (e.g., polytetrafluoroethylene, etc.), one or more flame retardant materials, one or more thermoset materials, one or more thermoplastic materials, one or more materials having a low dielectric constant, etc. In certain embodiments, the dielectric material 115 may be formed as relatively solid material. In other embodiments, the dielectric material 115 may be formed as foamed material. Any suitable foam rate may be utilized as desired for foamed material.

The dielectric material 115 may also be formed with a wide variety of suitable dimensions, such as any suitable thickness and/or cross-sectional area. In certain embodiments, a thickness and/or other dimensions of the dielectric material 115 may be based at least in part on the dimensions of the inner and/or outer conductors 105, 110 and/or a desired separation distance between the two conductors 105, 110. In certain embodiments, as illustrated in FIG. 1, the dielectric material 115 may be formed as a relative solid component (e.g., a solid layer, a foamed layer, etc.) between the inner conductor 105 and the outer conductor 115. In other embodiments, as described in greater detail below with reference to FIG. 2, the dielectric material 115 may be formed with spaces between a plurality of sections or components of the dielectric material 115. For example, the dielectric material 115 may be formed in a plurality of sections that are radially spaced around an outer circumference of the inner conductor 105, and gaps or spaces may be positioned between adjacent sections of the dielectric material 115. In yet other embodiments, as described in greater detail below with reference to FIGS. 3A-3B, the dielectric material 115 may be formed as a layer (e.g., a solid layer, a foamed layer, a tube, etc.) that spirals around the inner conductor 105 along a longitudinal direction. As desired, spaces may be formed between adjacent wrappings of the spiral. As yet another example, the dielectric material 115 may include a plurality of components that spiral around the inner conductor 105, such as two or more spirals that are longitudinally offset from one another. A wide variety of other configurations may be utilized to form dielectric material 115.

In certain embodiments, one or more optical fibers 120 may additionally be incorporated into the radiating coaxial cable 100. For example, one or more optical fibers 120 may be positioned between the inner and outer conductors 105, 110. In certain embodiments, one or more optical fibers 120 may be embedded or otherwise positioned within the dielectric material 115. For example, as shown in FIG. 1, one or more optical fibers 120 may be positioned within one or more channels or slots 130 formed within the dielectric material 115. Any number of channels or slots 130 may be formed or otherwise positioned within the dielectric material 115 as desired. Additionally, any suitable number of optical fibers 120 may be positioned within each respective channel 130. Although a single optical fiber 120 and corresponding channel 130 are illustrated in FIG. 1, any suitable number of fibers and/or channels may be utilized in other embodiments.

Figure 2:
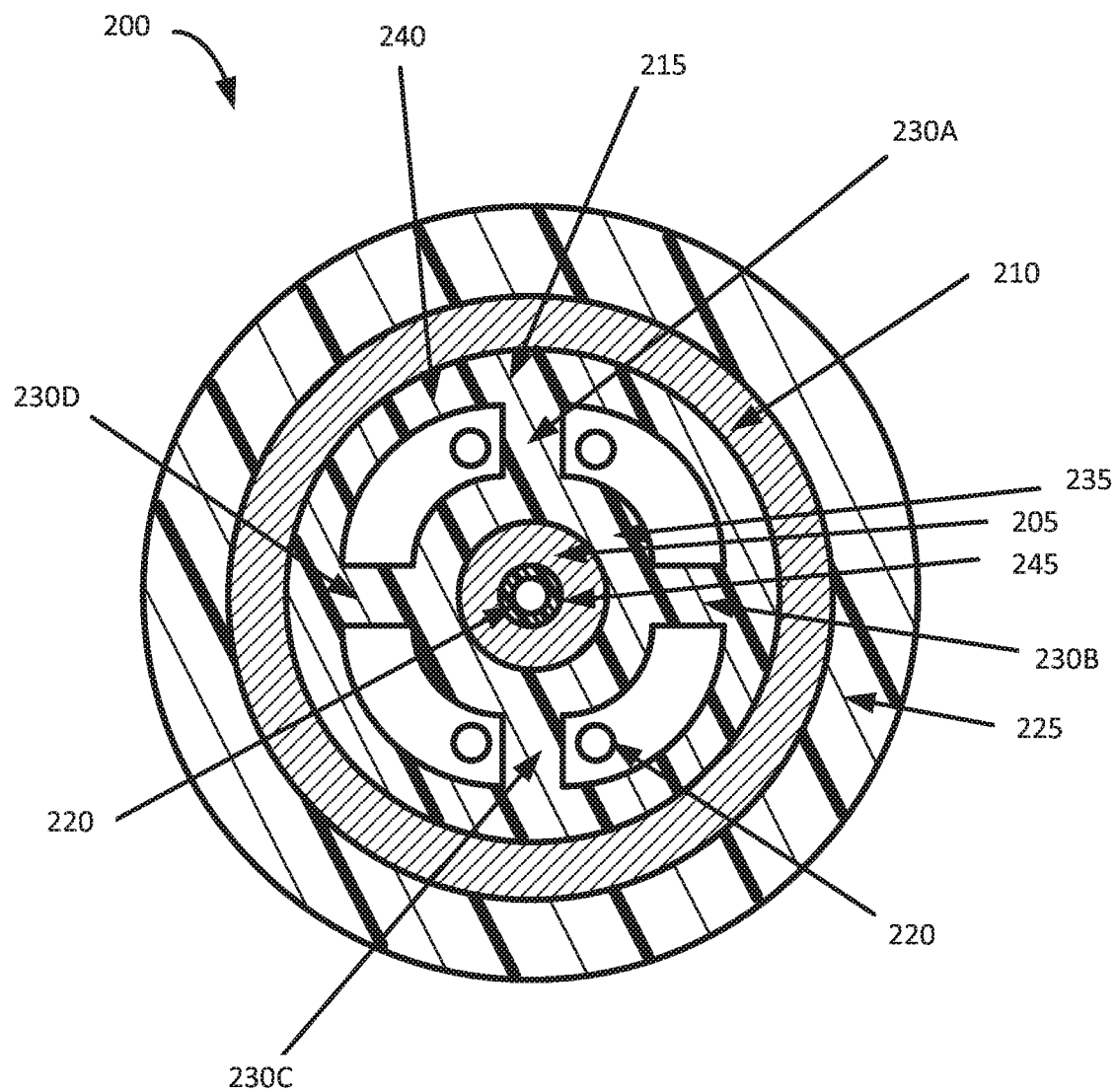

As another example, as illustrated in FIG. 2, one or more optical fibers may be positioned within spaces or gaps formed between sections of dielectric material. As yet another example, as illustrated in FIG. 3, the dielectric material 115 may include one or more tubes (e.g., buffer tubes, microtubes, etc.) that are positioned between the inner and outer conductors 105, 110, such as a tube that is helically wound around the inner conductor 105, and one or more optical fibers may be positioned within the one or more tubes. Regardless of the construction utilized to incorporate optical fibers into a radiating coaxial cable 100, the optical fibers may facilitate data transmission within the cable.

In other embodiments, one or more optical fibers 120 may be embedded or positioned within the inner or center conductor 105. For example, the inner conductor 105 may be formed as a hollow conductor or as a conductor that includes one or more longitudinally extending channels or cavities. One or more optical fibers 120 may be positioned within a hollow portion or within a channel of the inner conductor 105. In other embodiments, the inner conductor 105 may be formed with a plurality of electrically connected sections, and gaps may be formed between various sections of the inner conductor 105. As desired, one or more optical fibers 120 may be positioned within the gaps. FIG. 2 illustrates an example cable in which one or more optical fibers are positioned within an inner conductor 105. Regardless of whether optical fiber(s) 120 are positioned within the dielectric material 115 or the inner conductor 105, the optical fiber(s) 120 may be positioned within the outer conductor 110 or an area defined by the outer conductor 110.

Any number of optical fibers 120 may be incorporated into a coaxial cable 100 as desired. Each optical fiber 120 may be a single mode fiber, multi-mode fiber, pure-mode fiber, polarization-maintaining fiber, multi-core fiber, or some other optical waveguide that carries data optically. Additionally, each optical fiber 120 may be configured to carry data at any desired wavelength (e.g., 1310 nm, 1550 nm, etc.) or combination of wavelengths and/or at any desired transmission rate or data rate. The optical fiber(s) 120 may also include any suitable composition and/or may be formed from a wide variety of suitable materials capable of forming an optical transmission media, such as glass, a glassy substance, a silica material, a plastic material, or any other suitable material or combination of materials. Each optical fiber 120 may also have any suitable dimensions. In certain embodiments, an optical fiber 120 may include a core that is surrounded by a cladding. Additionally, one or more suitable coatings may surround the cladding. Further, in various embodiments, one or more loose optical fibers, optical fiber ribbons, stacks of optical fibers, tight-buffered optical fibers, and/or other suitable optical fibers may be positioned within the cable 100.

With continued reference to the cable 100, a jacket 125 or suitable insulation may be formed around the outer conductor 110. The jacket 125 may enclose the internal components of the cable 100, seal the cable 100 from the environment, and provide strength and structural support. The jacket 125 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 125 may also include flame retardant materials, smoke suppressant materials, carbon black or other suitable material for protection against exposure to ultraviolet ("UV") light, and/or other suitable additives. The jacket 125 may include a single layer or, alternatively, multiple layers of material (i.e., multiple layers of the same material, multiple layers of different materials, etc.).

The coaxial cable 100 may be suitable for use in a wide variety of desired applications. For example, the coaxial cable 100 may be incorporated into cellular or mobile communications networks. In operation, one or more radiating coaxial cables may extend between amplifiers, repeaters, fiber multiplexers, and/or other suitable devices and equipment within a cellular network. The balanced conductors 105, 110 of a coaxial cable 100 may be utilized to transmit power signals that provide power to desired devices and equipment, such as the amplifiers repeaters, and/or fiber multiplexers. Data signals may be transmitted by the inner conductor 105 and/or the optical fiber(s) 120. In this regard, the coaxial cable 100 may transmit network data while simultaneously providing power to necessary network devices. Additionally, the slots formed in the outer conductor 110 of a radiating coaxial cable 100 may facilitate wireless transmission with external devices, such as mobile devices. As desired, the cable 100 may be deployed in a wide variety of environments, such as along roadways, within tunnels (e.g., subway tunnels, etc.), within stadiums and concert halls, etc. The inventive radiating coaxial cable 100 may be utilized in other suitable applications and environments as desired, such as industrial applications, automotive and/or vehicle applications (e.g., to facilitate wireless communication within a vehicle, etc.), etc.

Indeed, the coaxial cable 100 may be suitable for indoor, outdoor, and/or indoor/outdoor use. The cable 100 may be suitable for high vertical rise, buried, aerial, tunnel, shaft, conduit, and/or other installation. The cable 100 may also be suitable for deployment within a wide variety of environmental conditions. For example, the cable 100 may typically be deployed in environments having temperatures between −50° C. and 70° C. The cable 100 may also be employed in environments having varying degrees of humidity. As desired, proper selection of materials utilized to form the cable 100 may be based at least in part upon the environment in which the cable 100 is intended to be deployed.

FIG. 2 depicts a cross-sectional view of another example coaxial cable 200, according to an illustrative embodiment of the disclosure. Much like the cable 100 of FIG. 1, the cable 200 may include an inner conductor 205, an outer conductor 210, and dielectric material 215 positioned between the inner and outer conductors 205, 210. As desired, one or more optical fibers 220 may be positioned between the inner and outer conductors 205, 210. Additionally, a jacket 225 may be formed around the outer conductor 210. Each of these components may be similar to those described above with reference to the cable 100 of FIG. 1.

However, the dielectric material 215 of the cable 200 is depicted as including a plurality of sections 230A-D that are radially spaced around an outer circumference of the inner conductor 205. In other words, the dielectric material 215 may include a plurality of spokes that extend between the inner conductor 205 and the outer conductor 210. Although four sections 230A-D are depicted in FIG. 2, any suitable number of sections may be incorporated into the dielectric material 215 as desired in various embodiments. Additionally, in certain embodiments, the sections 230A-D may be characterized as spokes that are positioned between the two conductors 205, 210.

In certain embodiments, the dielectric material 215 may additionally include an inner layer 235 adjacent to the inner conductor 205 and/or an outer layer 240 adjacent to the outer conductor 210. For example, an inner layer 235 may extend around or substantially around an outer periphery of the inner conductor 205, and the plurality of sections 230A-D may extend from the inner layer 235. As another example, an outer layer 240 may extend around or substantially around an inner circumference of the outer conductor 210. In other embodiments, at least one of an inner layer 235 and/or an outer layer 240 may include one or more sections that each extend partially around an outer periphery or circumference of an adjacent conductor. For example, a layer 235, 240 may include a plurality of components that each extend between at least two adjacent sections 230A-D or spokes. The area between adjacent sections 230A-D or spokes may be filled with any desirable material, such as air, another gas, a filling compound, etc. As desired, one or more optical fibers 220 may be positioned within the area or gaps between adjacent sections 230A-D or spokes of dielectric material.

FIG. 2 illustrates one example dielectric material geometry that includes a plurality of spokes positioned between the inner and outer conductors 205, 210. A wide variety of other suitable geometries that include a combination of spokes with corresponding gaps or spaces between adjacent spokes may be utilized as desired.

With continued reference to FIG. 2, in certain embodiments, one or more optical fibers 220 may additionally or alternatively be positioned within the inner conductor 205. For example, the inner conductor 205 may be formed as a hollow conductor or as a conductor that includes one or more longitudinally extending channels 245 or cavities. As desired, one or more optical fibers 220 may be positioned within a hollow portion or a channel 245 of the inner conductor 205.

As desired in certain embodiments, a dielectric layer, buffer tube, or tight buffer may be formed around one or more optical fibers 220 that are positioned or embedded within the inner conductor 205. For example, a dielectric or buffer layer (e.g., tight buffer, buffer tube, etc.) may be formed around one or more optical fibers 220. Alternatively, one or more optical fibers may be positioned within a dielectric or buffer layer. The inner conductor 205 may then be formed or positioned around the dielectric or buffer layer. In other embodiments, one or more optical fibers 220 may be air blown or otherwise positioned within a hollow inner conductor 205 or within a channel formed through the inner conductor 205. Indeed, a wide variety of suitable techniques may be utilized as desired to position one or more optical fibers within an inner conductor 205.

Figure 3A:
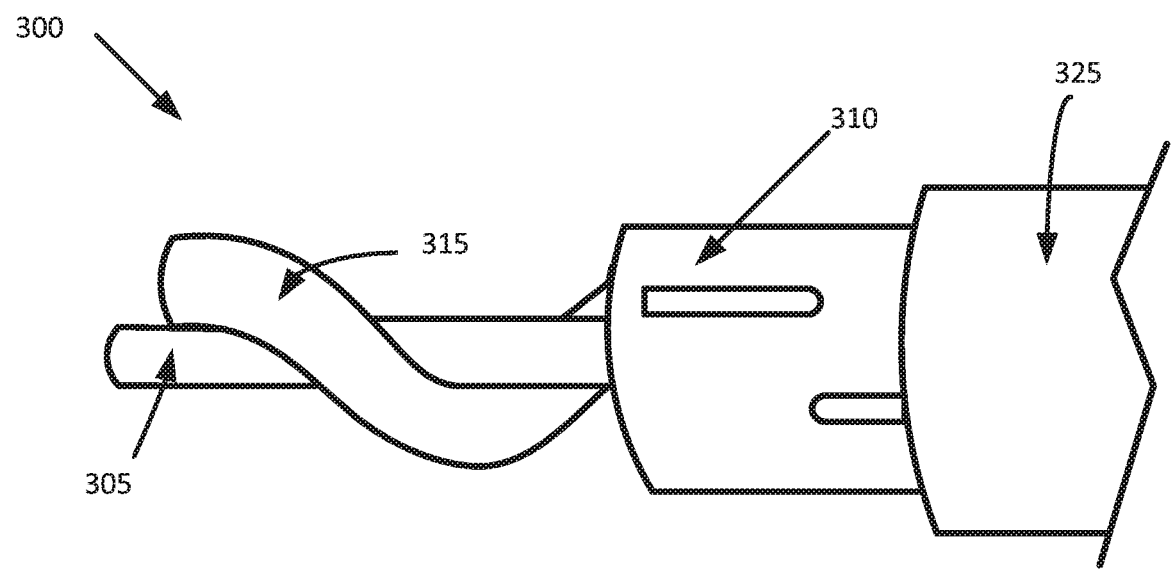
Figure 3B:
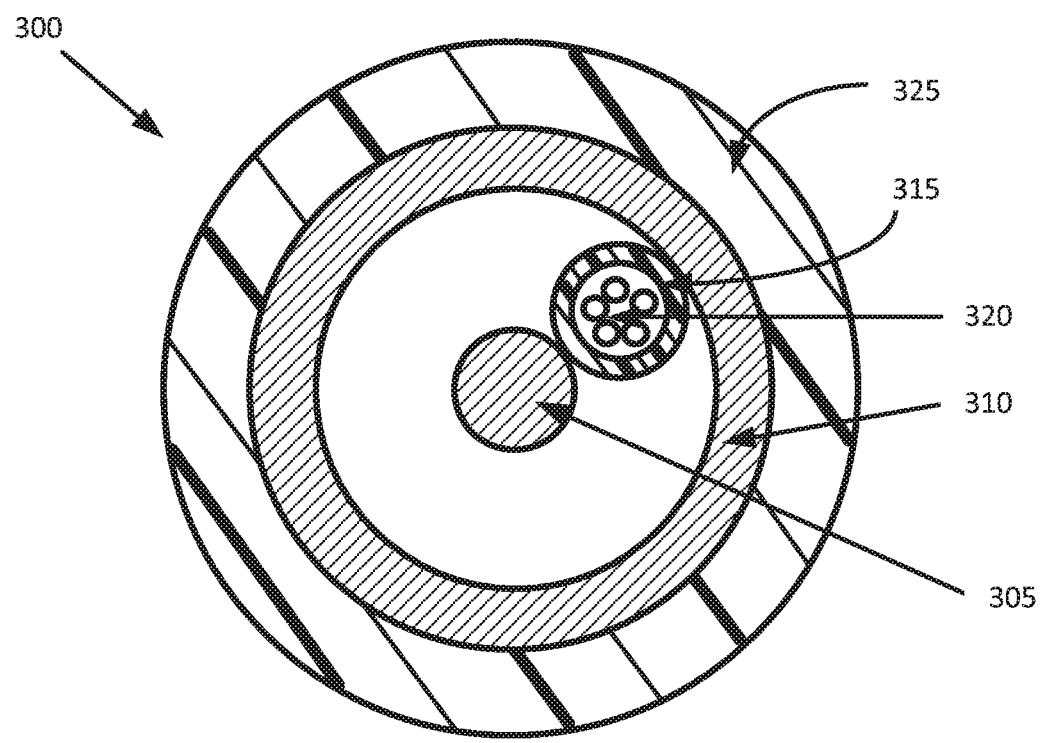

FIG. 3A depicts a perspective view of another example coaxial cable 300, according to an illustrative embodiment of the disclosure. FIG. 3B depicts a cross-section view of the cable 300. Much like the cable 100 of FIG. 1, the cable 300 may include an inner conductor 305, an outer conductor 310, and dielectric material 315 positioned between the inner and outer conductors 305, 310. Additionally, one or more optical fibers 320 may be optionally positioned between the inner and outer conductors 305, 310. A jacket 325 may also formed around the outer conductor 310. Each of these components may be similar to those described above with reference to the cable 100 of FIG. 1.

However, the dielectric material 315 of the cable 300 is depicted as a component that spirals around the inner conductor 305 along a longitudinal direction. As a result, the dielectric material required for the cable 300 may be reduced, and improved dielectric performance may be attained n the cable 300. In certain embodiments, spaces may be formed between adjacent wrappings or spirals of the dielectric material 315. As desired, the dielectric material 315 may be wrapped, twisted, or spiraled around the inner conductor 305 with any suitable twist lay. Additionally, the dielectric material 315 may be formed with a wide variety of suitable thickness, diameters, cross-sectional shapes, and/or other dimensions.

In other embodiments, the dielectric material 315 may include a plurality of components that spiral around the inner conductor 305, such as two or more components that are spirally wrapped around the inner conductor 305 and that are longitudinally offset from one another. A wide variety of other configurations may be utilized to form dielectric material that spirals or twists around the inner conductor 305.

In certain embodiments, the dielectric material 315 may include at least one tube or component with one or more longitudinally extending channels that is spiraled or twisted around the inner conductor 305. Ad desired, one or more optical fibers 320 may be positioned within a tube or component that is incorporated into the dielectric material 315. For example, a tube or component may function as a buffer tube or microtube that houses optical fiber(s). A tube may be formed from a wide variety of suitable dielectric materials, such as any of the materials discussed above with reference to FIG. 1. Additionally, a tube may be formed with a wide variety of suitable dimensions, such as any suitable inner diameter, outer diameter, and/or thickness. A tube may also be configured to house any suitable number of optical fibers.

The cables 100, 200, 300 illustrated in FIGS. 1-3B are provided by way of example only. Embodiments of the disclosure contemplate a wide variety of other cables and cable constructions. These other cables may include more or less components than the cables 100, 200, 300 illustrated in FIGS. 1-3B. Additionally, certain components may have different dimensions and/or be formed from different materials than the components illustrated in FIGS. 1-3B.

As set forth above, a coaxial cable (e.g., any of the cables 100, 200, 300 illustrated in FIGS. 1-3B) may be formed as a leaky or radiating coaxial cable. For example, one or more slots may be formed through or partially through an outer conductor of a coaxial cable in order to facilitate wireless communication via the cable. As described in greater detail above with reference to FIG. 1, a wide variety of suitable slot configurations and/or arrangements may be formed in the outer conductor as desired in various embodiments. A few non-limiting examples of slot configurations are illustrated in FIGS. 4A-4C.

Figure 4A:
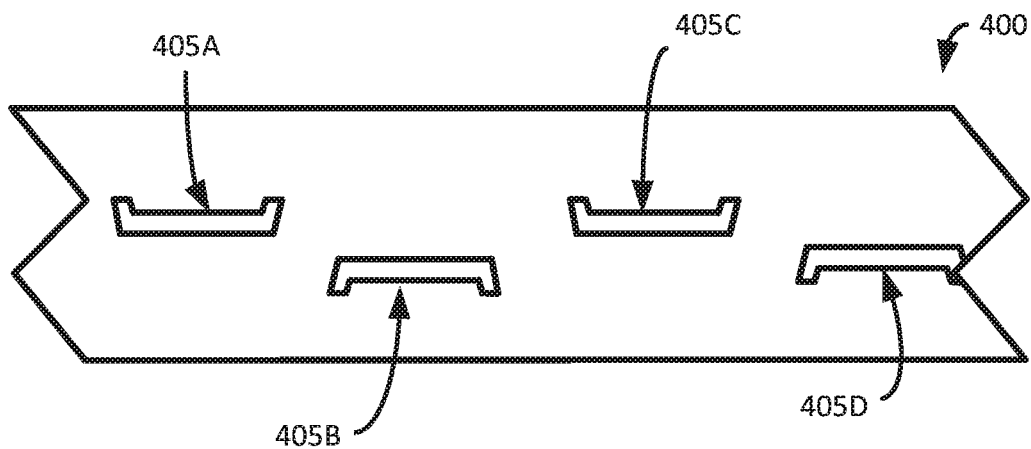
FIGS. 4A-4C depict top view of example outer or shield conductors that may be utilized in a coaxial cable to facilitate signal leakage and/or wireless communication, according to illustrative embodiments of the disclosure.

FIG. 4A illustrates a top view of a first example outer or shield conductor 400 that may be utilized in a coaxial cable to facilitate signal leakage and/or wireless communication. As shown, sets of one or more slots may be positioned at longitudinally spaced locations along a length of the conductor 400. For example, slots 405A-D may be longitudinally spaced along the conductor 400. Although the top view of FIG. 4A illustrates a single slot for each longitudinally spaced set, it will be appreciated that additionally slots may be included in a set at radially spaced locations along the conductor 400.

As described in greater detail above with reference to FIG. 1, each slot may be formed with a wide variety of suitable dimensions. FIG. 4A illustrates longitudinally extending slots that include enlarged portions at opposite longitudinal ends. As desired, the enlarged portions may extend in opposite directions between longitudinally adjacent slots. Additionally, each slot may be positioned at a wide variety of radial locations along the conductor 400, and any suitable gap or distance may be present between adjacent slots.

Figure 4B:
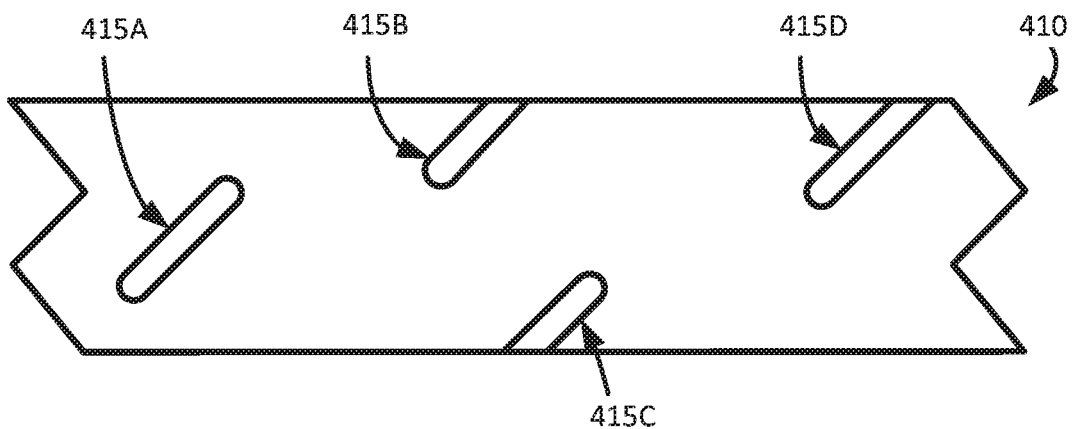
Figure 4C:
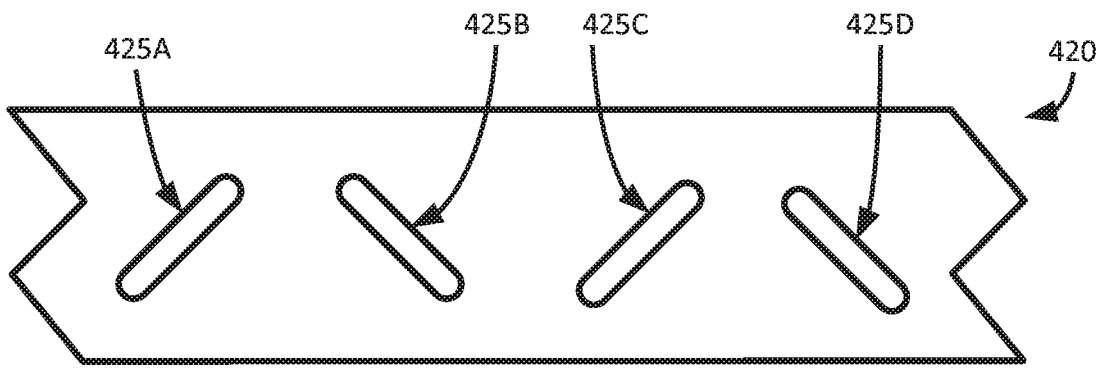

FIG. 4B illustrates a top view of another example outer or shield conductor 410 that may be utilized in a coaxial cable. Much like the conductor 400 of FIG. 4A, the conductor 410 depicts a plurality of longitudinally spaced slots 415A-D. Each slot (generally referred to as slot 415) is formed to extend at an angle relative to the longitudinal direction of the conductor 410. A slot 415 may be formed at any desired angle relative to the longitudinal direction. Additionally, each slot may be formed with a wide variety of suitable dimensions. Each slot may also be positioned at a wide variety of radial locations along the conductor 410, and any suitable gap or distance may be present between adjacent slots. FIG. 4C illustrates a top view of another example outer or shield conductor 420 that may be utilized in a coaxial cable. Much like the conductor 410 of FIG. 4B, the conductor 420 depicts a plurality of longitudinally spaced slots 425A-D that are each formed at an angle relative to the longitudinal direction of the conductor 420. However, the angles of longitudinally adjacent slots are alternated such that the slots extend in opposite angular directions relative to the longitudinal direction. Additionally, FIG. 4C depicts spaced slots 425A-D that are each positioned at approximately the same radial location along a circumference of the conductor 420 while the radial positions of slots are varied in the conductors 400, 410 of FIGS. 4A-4B.

Indeed, a wide variety of suitable slot configurations and/or geometries may be utilized as desired in various embodiments of the disclosure in order to form a radiating or leaky coaxial cable. In certain embodiments, slots may be formed and/or positioned in a configuration or arrangement that facilitates signal leakage at a desired frequency or within a desired range of frequencies. In this regard, the coaxial cable may be configured to facilitate wireless transmission at a desired frequency or within a desired range of frequencies.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A cable, comprising:
a center conductor having a first direct current resistance over a longitudinal length of the cable;
dielectric material formed around the center conductor;

an outer conductor coaxially formed around the center conductor and the dielectric material, the outer conductor having a second direct current resistance matched to the first direct current resistance over the longitudinal length and at least one slot formed through the outer conductor; and a jacket formed around the outer conductor.

2. The cable of claim 1, further comprising at least one optical fiber, at least one optical fiber positioned within an area defined by the outer conductor.

3. The cable of claim 2, wherein the at least one optical fiber is positioned between the center conductor and the outer conductor.

4. The cable of claim 2, wherein the at least one optical fiber is positioned within the center conductor.

5. The cable of claim 1, wherein the outer conductor comprises a conductive shield layer.

6. The cable of claim 1, wherein the outer conductor comprises a braided shield layer.

7. The cable of claim 1, wherein the at least one slot facilitates signal leakage through the outer conductor at a desired frequency.

8. The cable of claim 1, wherein the at least one slot comprises a plurality of slots.

9. The cable of claim 8, wherein the plurality of slots are spaced along the longitudinal length of the cable.

10. The cable of claim 1, wherein the dielectric material comprises foamed dielectric material.

11. The cable of claim 1, wherein the dielectric material comprises a plurality of spokes extending between the center conductor and the outer conductor.

12. A cable, comprising:
a center conductor having a first direct current resistance and configured to propagate a signal;
an outer conductive shield coaxially positioned around the center conductor and having a second direct current resistance matched to the first direct current resistance, wherein the outer conductive shield is configured to leak a part of the signal to an outside thereof;
dielectric material positioned between the center conductor and the outer conductive shield;
at least one optical fiber positioned within an area defined by the outer conductive shield; and
a jacket formed around the outer conductive shield.

13. The cable of claim 12, wherein the outer conductive shield comprises a braided shield.

14. The cable of claim 12, wherein the outer conductive shield comprises at least one slot configured to leak the part of the signal at a desired frequency.

15. The cable of claim 14, wherein the at least one slot comprises a plurality of slots.

16. The cable of claim 15, wherein the plurality of slots are spaced along a longitudinal length of the cable.

17. The cable of claim 12, wherein the dielectric material comprises foamed dielectric material.

18. The cable of claim 12, wherein the dielectric material comprises a plurality of spokes extending between the center conductor and the outer conductive shield.

19. A cable, comprising:
a center conductor having a first direct current resistance and configured to propagate a signal;
an outer conductor coaxially positioned around the center conductor and having a second direct current resistance matched to the first direct current resistance over a longitudinal length of the cable, wherein the outer conductor comprises a plurality of slots formed therein and configured to leak a part of the signal;
dielectric material positioned between the center conductor and the outer conductive shield;
at least one optical fiber positioned within an area defined by the outer conductor; and
a jacket formed around the outer conductor.

20. The cable of claim 19, wherein the at least one optical fiber extends through the dielectric material.

* * * * *